(12) United States Patent
Daito

(10) Patent No.: US 7,307,217 B2
(45) Date of Patent: Dec. 11, 2007

(54) LOCKING STRUCTURE FOR PROTECTOR AND WIRE HARNESS

(75) Inventor: Koji Daito, Kosai (JP)

(73) Assignee: Yazaki Corporation, Tokyo (JP)

( * ) Notice: Subject to any disclaimer, the term of this patent is extended or adjusted under 35 U.S.C. 154(b) by 43 days.

(21) Appl. No.: 10/989,440

(22) Filed: Nov. 17, 2004

(65) Prior Publication Data

US 2005/0145410 A1 Jul. 7, 2005

(30) Foreign Application Priority Data

Nov. 26, 2003 (JP) .............................. P2003-395736

(51) Int. Cl.
*H02G 3/04* (2006.01)

(52) U.S. Cl. .................. 174/72 A; 174/68.1; 174/68.3; 174/70 C; 174/96; 138/157; 138/158

(58) Field of Classification Search ................... 174/48, 174/68.1, 68.3, 70 C, 72 A, 96, 97, 98, 100, 174/101, 135; 138/157, 158, 162, 166, 167, 138/168

See application file for complete search history.

(56) References Cited

U.S. PATENT DOCUMENTS

| 4,864,082 A | * | 9/1989 | Ono et al. ..................... 174/97 |
| 4,891,471 A | * | 1/1990 | Ono et al. .................. 174/68.3 |
| 4,951,716 A | * | 8/1990 | Tsunoda et al. ............. 138/162 |
| 5,332,866 A | * | 7/1994 | Sawamura ................... 174/101 |
| 5,597,980 A | * | 1/1997 | Weber ........................ 174/72 A |
| 5,709,249 A | * | 1/1998 | Okada et al. ................ 138/162 |
| 6,049,040 A | * | 4/2000 | Biles et al. ................. 174/68.3 |
| 6,677,533 B2 | * | 1/2004 | Bernard et al. ............. 174/101 |
| 6,717,055 B2 | * | 4/2004 | Kato ......................... 174/72 A |
| 6,878,879 B2 | * | 4/2005 | Takahashi et al. ......... 174/72 A |
| 6,881,901 B2 | * | 4/2005 | Egan ......................... 174/72 C |
| 6,967,286 B2 | * | 11/2005 | Daito ........................ 174/68.3 |

FOREIGN PATENT DOCUMENTS

| JP | 01097116 A | * | 4/1989 |
| JP | 02299409 A | * | 12/1990 |
| JP | 05161231 A | * | 6/1993 |
| JP | 06086426 A | * | 3/1994 |
| JP | 2002-253533 A | | 9/2002 |

* cited by examiner

Primary Examiner—Dhiru R. Patel
(74) Attorney, Agent, or Firm—Sughrue Mion, PLLC

(57) ABSTRACT

A bundle 11 of electric wires is contained in a protector (20) which is a tubular body formed by assembling a main body (21) and a cover (22) together, and the main body (21) and the cover (22) are fixed to each other by means of locking parts (30). On this occasion, backlash preventive locking parts 31 each having backlash preventing means (34) are arranged in at least two positions, in place of the locking parts 30 which are arranged on the main body (21) and the cover (22) at a determined interval in a longitudinal direction. As the results, backlashes of the locking parts can be eliminated by a simple structure, and a twist of the protector can be prevented.

8 Claims, 7 Drawing Sheets

LOCKING STRUCTURE FOR PROTECTOR AND WIRE HARNESS

BACKGROUND OF THE INVENTION

1. Field of the Invention

The present invention relates to a locking structure for a protector and a wire harness, and more particularly, to the locking structure for the protector for protecting the wire harness which is arranged, for example, in an automobile, and the wire harness itself.

2. Related Art

As a conventional locking structure for a protector and a wire harness, such a structure as shown in FIGS. 6 and 7 has been known. As shown in FIG. 6, a protector 100 in a form of a tubular body includes a main body 101 and a cover 102 which can be assembled together so as to contain a bundle 103 of electric wires. A plurality of locking parts 110 for enabling the main body 101 and the cover 102 to be engaged with each other are provided between this main body 101 and the cover 102.

As shown in FIG. 7, each of the locking parts 110 includes a latched part 111 in a gate-like shape having a space 111a inside, which is provided in either one of the main body 101 and the cover 102 (for example, in the main body 101), and a latching piece 112 in a tongue-like shape having a pawl 112a at its distal end, which is provided on the other of the main body 101 and the cover 102.

Accordingly, locking operation of the cover 102 to the main body 101 will be conducted, as shown in FIG. 7, by inserting the latching piece 112 into the space 111a in the latched part 111, and then, by engaging the pawl 112a at the distal end of the latching piece 112 with the latched part 111.

However, as shown in FIG. 8, a width of the latching piece 112 has been generally smaller than a width of the space 111a in the latched part 111, and gaps 113 have been formed between the latched part 111 and the latching piece 112. Therefore, there has been a problem that a backlash may occur, and the protector 100 may be twisted.

Under the circumstances, such a countermeasure as disclosed in Patent Document 1 has been taken in the conventional art as shown in Unexamined Japanese Patent Publication 2002-253533. Specifically, as shown in FIG. 9, the latched part 111 is provided with latching projections 114 having pointed ends and projecting inwardly. When the latching piece 112 is inserted into the space in the latched part 111, the pointed ends of the latching projections 114 will be collapsed so as to press the latching piece 12, thereby preventing the backlash.

By the way, the backlash between the latched part 111 and the latching piece 112 can be prevented, by employing the locking structure as shown in Patent Document 1. However, in order to provide the latching projections 114 on the inner faces of the latched part 111, a complicated mold has been required, which has led to such an inconvenience that a rise of the production cost has been inevitable.

SUMMARY OF THE INVENTION

The invention has been made in view of the above described problem, and it is an object of the invention to provide a locking structure for a protector in which a backlash can be easily prevented, and a wire harness.

In order to attain the above described object, there is provided, according to the invention, a locking structure for a protector comprising a main body and a cover which are assembled together to form a tubular body capable of containing a bundle of electric wires, and a plurality of locking parts for enabling the aforesaid main body and aforesaid cover to be engaged with each other, the aforesaid locking parts being arranged on the aforesaid main body and aforesaid cover at a determined interval in a longitudinal direction thereof, provided in that backlash preventive locking parts each having backlash preventing means are arranged in at least two positions out of positions where the aforesaid locking parts are to be arranged.

In the locking structure for the protector having the above described structure, the bundle of electric wires is contained in the protector which is the tubular body formed by assembling the main body and the cover together, and the main body and the cover are fixed to each other by means of the locking parts. On this occasion, because in at least two positions of the locking parts which are arranged on the main body and the cover at a determined interval in the longitudinal direction, the backlash preventive locking parts each having the backlash preventing means are arranged in place of the locking parts, backlashes of the locking parts can be eliminated by a simple structure, and a twist of the protector can be prevented.

Moreover, the locking structure for the protector according to the invention is provided in that the aforesaid backlash preventive locking parts are arranged at least in opposite end parts in the longitudinal direction of the aforesaid main body and aforesaid cover.

In the locking structure for the protector having the above described structure, the backlash preventive locking parts are provided, in place of the locking parts, in at least both forward and backward end parts of the tubular body which is formed by assembling the main body and the cover together, and therefore, backlashes of the locking parts can be prevented at both end parts of the tubular body. In this manner, the protector can be made difficult to be twisted in its entirety.

Further, the locking structure for the protector according to the invention is provided in that the aforesaid tubular body formed by assembling the aforesaid main body and aforesaid cover is crooked, and that the aforesaid backlash preventive locking parts are arranged near a crooked part of the aforesaid tubular body.

In the locking structure for the protector having the above described structure, in case where the protector is crooked, the backlash preventive locking parts are arranged in place of the locking parts which are arranged near the crooked part of the tubular body, and thus, backlashes of the locking parts can be prevented at the crooked part of the tubular body. In this manner, the protector can be made difficult to be twisted.

Still further, the locking structure for the protector according to the invention is provided in that the aforesaid backlash preventive locking parts are arranged so as to be opposed to each other along a direction intersecting the longitudinal direction of the aforesaid tubular body.

In the locking structure for the protector having the above described structure, the backlash preventive locking parts are employed, in place of the locking parts, so as to be opposed on both right and left sides in the longitudinal direction of the tubular body which is formed by assembling the main body and the cover together. Therefore, backlashes of the locking parts can be prevented, in whatever direction forces may be exerted. In this manner, the protector can be made difficult to be twisted.

Still further, the locking structure for the protector according to the invention is provided in that each of the aforesaid backlash preventive locking parts includes a latching piece extending from either one of the aforesaid main body and aforesaid cover to the other, and a latched part provided in the other of the main body and cover, the aforesaid latching piece being adapted to be inserted into the aforesaid latched part, wherein a width of the aforesaid latching piece is substantially same as, but slightly larger than an inner width of the aforesaid latched part, and the aforesaid latching piece is provided, on its opposite end edges in a lateral direction, with tapered parts which are gradually reduced in thickness in the lateral direction of the latching piece.

In the locking structure for the protector having the above described structure, the backlash preventive locking part is formed in such a manner that the width of the latching piece is made substantially same as, but slightly larger than the inner width of the latched part, and the latching piece is provided, on its opposite end edges in the lateral direction, with the tapered parts which are reduced in thickness outwardly. Therefore, when the latching piece is fitted to an inside of the latched part, the tapered parts will be pushed against the latched part. Consequently, the tapered parts of the latching piece will be pressed by the latched part and deformed, enabling the latching piece to be prevented from rattling with respect to the latched part. Moreover, the latching piece can be easily manufactured by employing a simple mold, because the tapered parts are provided on both edge parts of the latching piece.

A wire harness according to the invention is provided in that a protector having the locking structure for the protector, as described in any one of the objects, is mounted on the wire harness.

In the wire harness having the above described structure, the backlash preventive locking parts are appropriately provided, in place of the locking parts, on the protector which is mounted on the wire harness. Therefore, backlashes of the locking parts can be eliminated, and a twist of the protector can be prevented. In this manner, determined parts of the wire harness can be reliably protected.

According to the invention, backlashes of the locking parts can be eliminated by a simple structure, and a twist of the protector can be prevented.

DETAILED DESCRIPTION OF THE PREFERRED EMBODIMENTS

Figure 1:
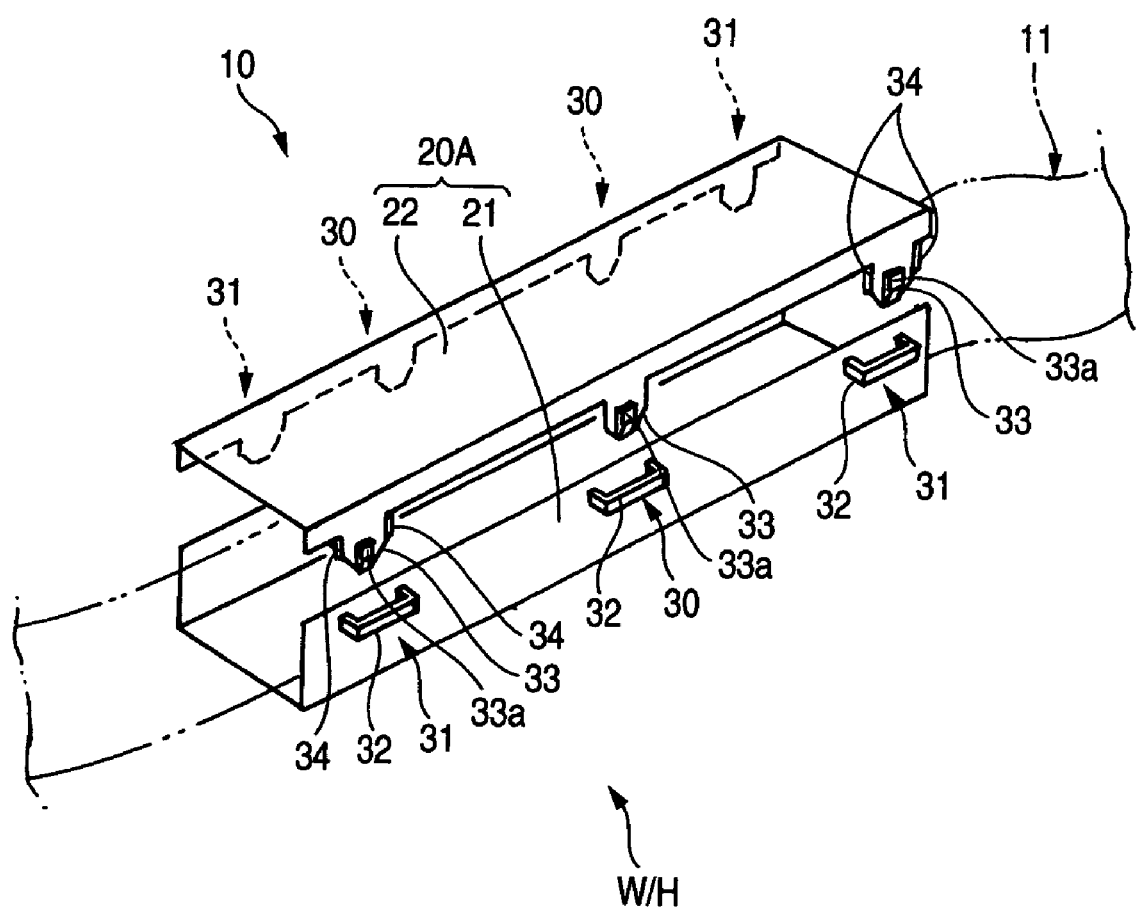
FIG. 1 is a perspective view showing a locking structure for a protector and a wire harness in a first embodiment of the invention.

Now, embodiments according to the invention will be described referring to the drawings.

As shown in FIG. 1, in a locking structure 10 for a protector according to the invention, a protector 20A which is a tubular body formed by assembling a main body 21 and a cover 22 together so as to contain a bundle 11 of electric wires, is provided with a plurality of locking parts 30 which can engage the main body 21 and the cover 22 with each other. These locking parts 30 are arranged on the main body and the cover 22 at a determined interval in a longitudinal direction thereof (in a direction from left to right in FIG. 1), and at least two of the locking parts 30 are formed as backlash preventive locking parts 31.

For example, in the protector 20A as shown in FIG. 1, at both sides (upper and lower sides in FIG. 1) of the protector 20A which is a rectilinear tubular body, the backlash preventive locking parts 31 are arranged at opposite end parts in the longitudinal direction (right and left end parts in FIG. 1), and the ordinary locking part 30 is arranged in an intermediate part.

In both the locking part 30 and the backlash preventive locking part 31, a latched part 32 is provided on either one of the main body 21 and the cover 22 (for example, on the main body 21 in this embodiment), and a latching piece 33 is provided on the other of them (on the cover 22, in this embodiment).

Figure 2:
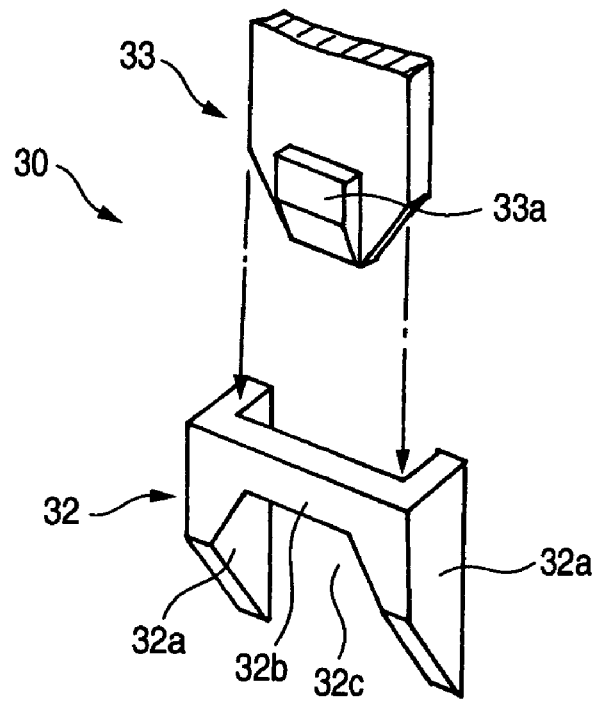
FIGS. 2A-2B are sectional views of a locking part.
Figure 2:
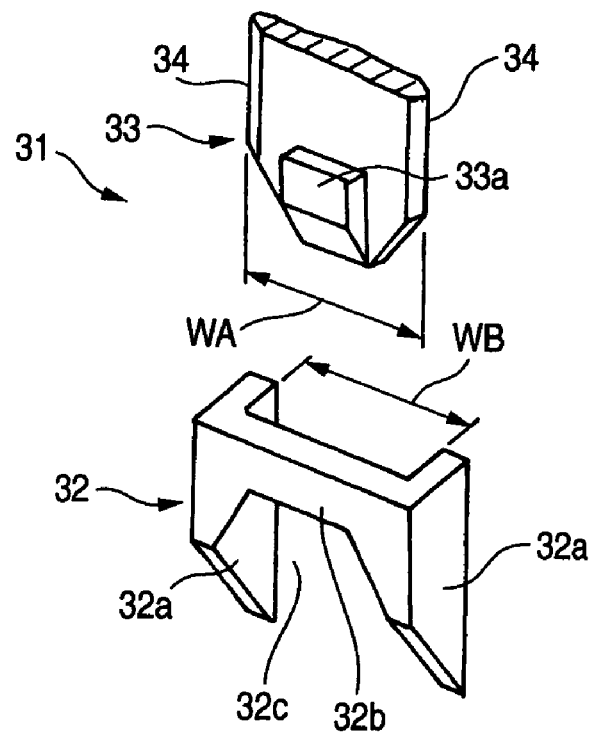

FIG. 2(A) shows the locking part 30, and FIG. 2(B) shows the backlash preventive locking part 31. As shown in FIGS. 2(A) and (B), both in the locking part 30 and the backlash preventive locking part 31, the latched part 32 is formed in a gate-like shape having a pair of support walls 32a and a latching beam 32b which interconnects upper ends of the support walls 32a, and a space 32c is formed inside the latched part 32. The latching piece 33 is an elastic member in a tongue-like shape and provided with a pawl 33a in a trapezoidal shape having a pointed end at a distal end (a lower end in FIG. 2) of an outer face thereof. The backlash preventive locking part 31 is further provided with tapered parts 34 as backlash preventing means, at both right and left end parts of the latching piece 33.

FIGS. 3(A) to (C) show examples of sectional shapes of the latching pieces 33 in the backlash preventive locking parts 31.

Body parts 33b of latching pieces 33A, 33B and 33C having a certain thickness are respectively provided with tapered parts 34A, 34B and 34C, as the backlash preventing means, which are gradually reduced in thickness outwardly so as to form pointed edges.

It is to be noted that a width of the body part 33b corresponds to a width of the latching piece 33 in the locking part 30.

Figure 3:
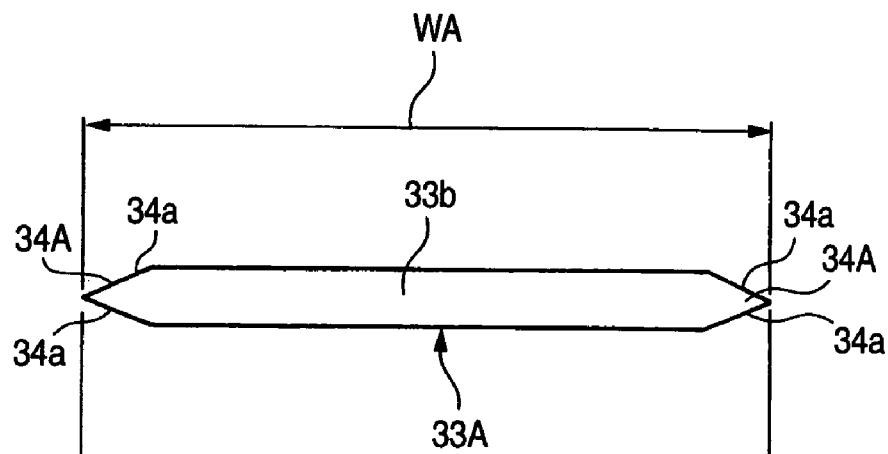
FIGS. 3(A) to (C) are sectional views of backlash preventive locking parts.
Figure 3:
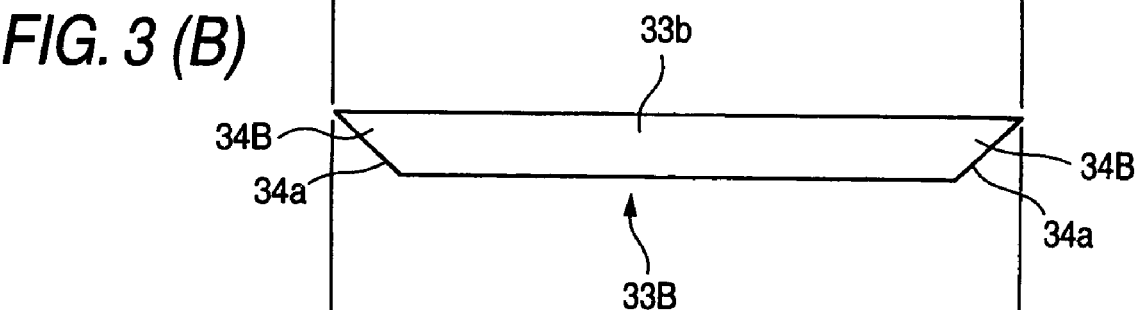
Figure 3:
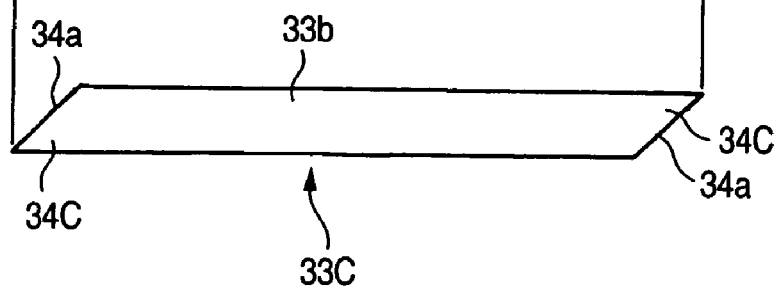

Specifically, in the latching piece 33A as shown in FIG. 3(A), tapered faces 34a are provided on both outer and inner faces (on both upper and lower faces in FIG. 3) of the tapered part 34A, and pointed outwardly toward both right and left ends.

Moreover, in the latching piece 33B as shown in FIG. 3(B), the tapered faces 34a are provided only on either one (for example, the inner face in this embodiment) of the outer face (the lower face in FIG. 3) and the inner face (the upper face in FIG. 3) of the tapered part 34B, and pointed outwardly. Further, in the latching piece 33C as shown in FIG. 3(C), the tapered faces 34a are provided in parallel.

An entire width WA of the latching pieces 33A, 33B, 33C is substantially the same as, but slightly larger than an inner width WB of the latched part 32 (See FIG. 2(B)), so that the latching pieces 33A, 33B, 33C can be inserted into the space 32c of the latched part 32, and the tapered parts 34A, 34B, 34C of the inserted latching pieces 33A, 33B, 33C may be pressed against the support walls 32a and adapted to be deformed.

Accordingly, in the locking part 30, when the latching piece 33 is inserted into the space 32c of the latched part 32, the pawl 33a will be hooked on the latching beam 32b to perform locking operation. On the other hand, in the backlash preventive locking part 31, the tapered parts 34 of the latching piece 33 are further pressed against the support walls 32a of the latched part 32, and a backlash of the latching piece 33 can be prevented.

On occasion of conducting engagement of the locking parts 30 or the backlash preventive locking parts 31, the backlash preventive locking parts 31 provided at both end parts of the tubular body are first engaged, then, the backlash preventive locking parts 31 in the intermediate part are engaged, and finally, the ordinary locking parts 30 are engaged.

As in the foregoing description, according to the locking structure for the protector and the wire harness as described above, at least two of the locking parts 30 which are arranged on the main body 21 and the cover 22 at a determined interval along the longitudinal direction are replaced with the backlash preventive locking parts 31. Therefore, backlashes of the locking parts 30 can be eliminated by a simple structure, and a twist of the protector can be prevented. In this manner, determined positions of a wire harness W/H can be reliably protected.

Moreover, the protector 20A is provided with the backlash preventive locking parts 31, in place of the locking parts 30, at least in the opposite end parts in the longitudinal direction, and therefore, backlashes of the locking parts 30 in the opposite end parts of the protector 20A can be eliminated.

Further, in case where the locking parts 30 or the backlash preventive locking parts 31 except the backlash preventive locking parts 31 on the opposite ends are provided in a staggered manner, as shown in FIG. 1, the interval between engagements in the longitudinal direction of the protector 20A will be shortened. Accordingly, a twist of the protector 20A can be more effectively prevented.

Figure 4:
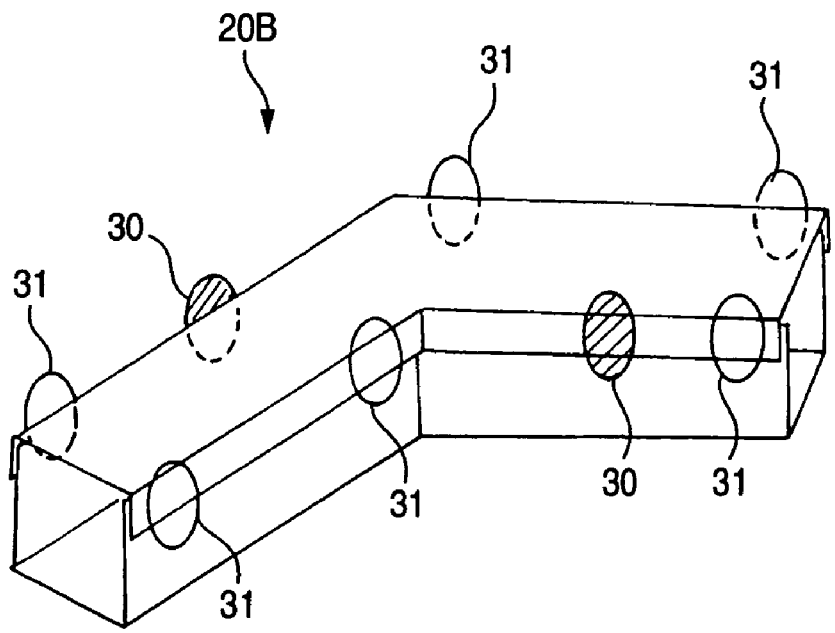
FIG. 4 is a perspective view showing a locking structure for a protector and a wire harness in a second embodiment of the invention.

Then, a second embodiment of the locking structure for the protector and the wire harness according to the invention is shown in FIG. 4. It is to be noted that members which are common with those in the above described first embodiment will be denoted with the same reference numerals and overlapping description will be avoided.

As shown in FIG. 4, a protector 20B is crooked in an L shape, and a plurality of locking parts 30 are arranged at a determined interval, on both right and left sides of the protector 20B. Backlash preventive locking parts 31 are provided, in place of the locking parts 30, in longitudinally opposite ends and at a position near a crooked part 23 of the protector 20B.

It is to be noted that the crooked part 23 includes not only two-dimensional crooking but also three-dimensional crooking. Moreover, the backlash preventive locking parts 31 provided near the crooked part 23 may be engaged in the same order as the backlash preventive locking parts 31 in the intermediate part, as has been described in the first embodiment.

In this manner, backlashes of the locking parts 30 can be eliminated near the crooked part 23, and so, it is possible to prevent the main body 21 and the cover 22 from rattling, because the locking parts 30 are loosened near the crooked part 23.

Figure 5:
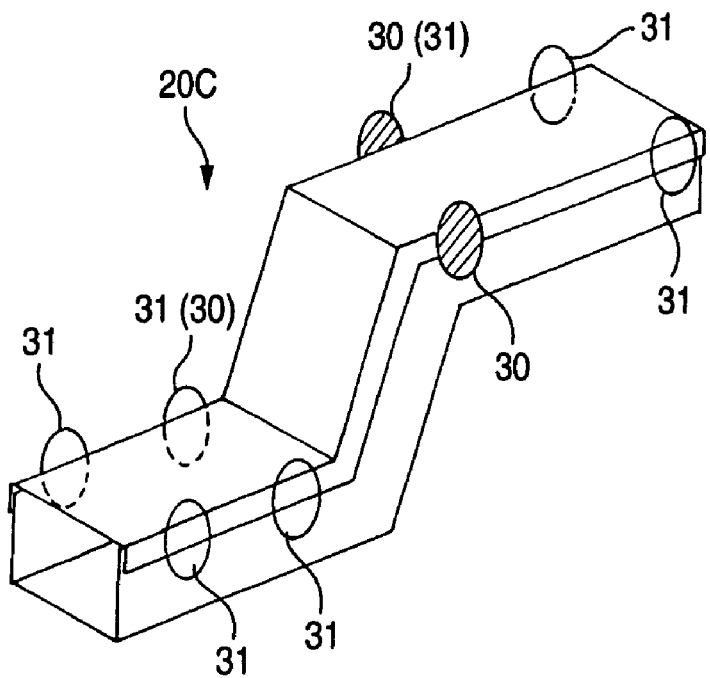
FIG. 5 is a perspective view showing a locking structure for a protector and a wire harness in a third embodiment of the invention.
Figure 6:
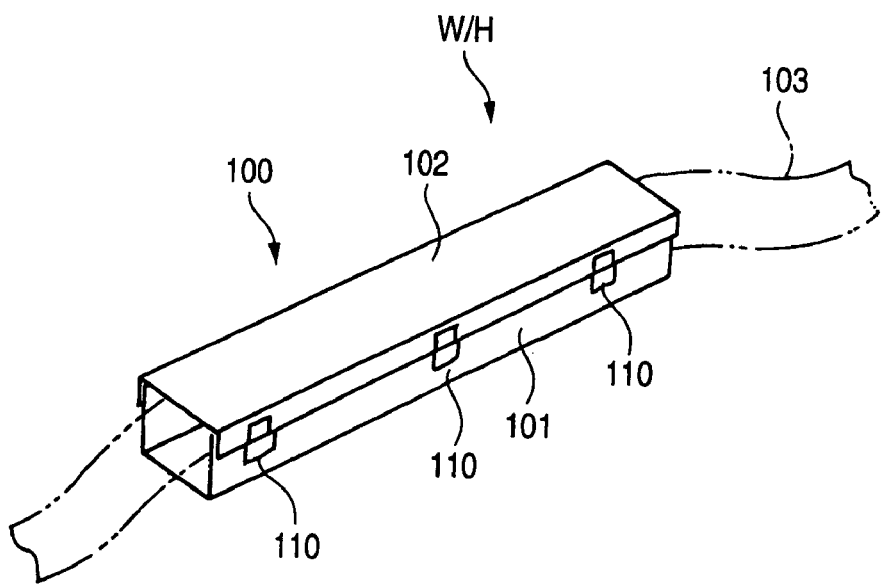
FIG. 6 is a perspective view showing a conventional protector.
Figure 7:
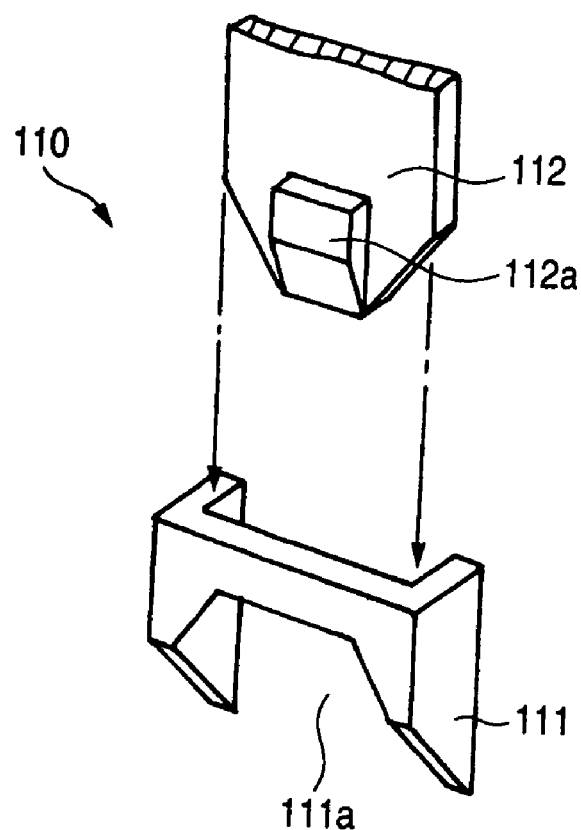
FIG. 7 is a perspective view showing a locking part in the conventional protector.
Figure 8:
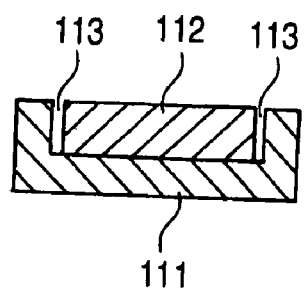
FIG. 8 is a sectional view for explaining a problem in the locking part in the conventional protector.
Figure 9:
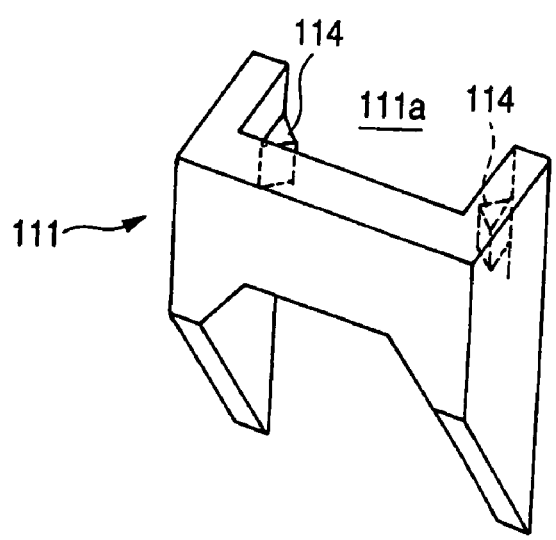
FIG. 9 is a perspective view showing a latched part in the conventional protector.

Then, a third embodiment of the locking structure for the protector and the wire harness according to the invention is shown in FIG. 5. It is to be noted that members which are common with those in the above described first and second embodiments will be denoted with the same reference numerals and overlapping description will be avoided.

Specifically, as shown in FIG. 5, a protector 20C is crooked at two positions, and a plurality of the locking parts 30 are arranged at determined positions on both sides thereof. The backlash preventive locking parts 31 are provided, in place of the locking parts 30, at a position near one of the crooked parts 23. The backlash preventive locking parts 31 are also provided along a direction intersecting the longitudinal direction of the protector 20C.

In this manner, backlashes of the locking parts 30 can be eliminated near the crooked parts 23, and so, it is possible to prevent the main body 21 and the cover 22 from rattling, because the locking parts 30 are loosened near the crooked parts 23.

Moreover, as shown by reference numerals in parenthesis, in FIG. 5, the backlash preventive locking parts 31 may be arranged in a staggered manner along the longitudinal direction of the protector 20C.

By arranging the backlash preventive locking parts 31 in this manner, it would be possible to prevent the backlash preventive locking parts 31 themselves from rattling, and at the same time, rigidity of the protector 20C resisting against torsional deformation will be enhanced.

The locking structure for the protector and the wire harness according to the invention are not limited to the above described embodiments, but appropriate modifications and improvements can be made.

For example, the shape of the protector 20 is not limited to those described in the embodiments, but various shapes can be employed.

Further, although in the above described embodiments, the locking parts 30 and the backlash preventive locking parts 31 are used together, it is possible to use only the backlash preventive locking parts 31 at all the positions.

What is claimed is:

1. A locking structure for a protector comprising:
   a main body and a cover assembled together to form a tubular body capable of containing a bundle of electric wires; and
   a plurality of locking parts for enabling said main body and said cover to be engaged with each other, said locking parts being arranged on said main body and said cover at a determined interval in a longitudinal direction thereof, at least two of said plurality of locking parts serving as backlash preventive locking parts, each backlash preventive locking parts having a backlash preventing latching piece which mates with an opposing latched part with an interference fit therebetween, said backlash preventive locking parts arranged in at least two positions out of positions where said locking parts are to be arranged.

2. A locking structure for a protector as claimed in claim 1, wherein said backlash preventive locking parts are arranged at least in opposite end parts in the longitudinal direction of said main body and said cover.

3. A locking structure for a protector as claimed in claim 1, wherein said tubular body formed by assembling said main body and said cover together is crooked to define a crooked part, and that said backlash preventive locking parts are arranged near the crooked part of said tubular body.

4. A locking structure for a protector as claimed in claim 1, wherein said backlash preventive locking parts are arranged so as to be opposed to each other along a direction intersecting the longitudinal direction of said tubular body.

5. A locking structure for a protector as claimed in claim 1, wherein said latching piece is adapted to be inserted into said latched part, and wherein a width of said latching piece is slightly larger than an inner width of said latched part, and said latching piece is provided, on its both end edges in a lateral direction, with tapered parts which are gradually reduced in thickness in the lateral direction of the latching piece.

6. A locking structure for a protector as claimed in claim 5, wherein said backlash preventive locking parts are arranged at least in opposite end parts in the longitudinal direction of said main body and said cover.

7. A locking structure for a protector as claimed in claim 5, wherein said tubular body formed by assembling said main body and said cover together is crooked to define a crooked part, and that said backlash preventive locking parts are arranged near the crooked part of said tubular body.

8. A locking structure for a protector as claimed in claim 5, wherein said backlash preventive locking parts are arranged so as to be opposed to each other along a direction intersecting the longitudinal direction of said tubular body.

\* \* \* \* \*